United States Patent [19]

Motta et al.

[11] Patent Number: 5,402,245

[45] Date of Patent: Mar. 28, 1995

[54] BI-LEVEL DIGITAL COLOR PRINTER SYSTEM EXHIBITING IMPROVED UNDERCOLOR REMOVAL AND ERROR DIFFUSION PROCEDURES

[75] Inventors: Ricardo J. Motta; Andrew E. Fitzhugh, both of Mountain View; Michael D. McGuire, Palo Alto; Gary J. Dispoto, Mountain View, all of Calif.

[73] Assignee: Hewlett-Packard Company, Palo Alto, Calif.

[21] Appl. No.: 187,567

[22] Filed: Jan. 27, 1994

[51] Int. Cl.$^6$ .............................................. H04N 1/21
[52] U.S. Cl. ...................................... 358/298; 358/523
[58] Field of Search ............... 358/296, 298, 300, 302, 358/523

[56] References Cited

U.S. PATENT DOCUMENTS

| | | | |
|---|---|---|---|
| 4,680,645 | 7/1987 | Dispoto et al. | 358/298 |
| 4,743,959 | 5/1988 | Frederiksen | 348/396 |
| 4,866,514 | 9/1989 | Yeomans | 358/523 |

OTHER PUBLICATIONS

"HP DeskWriter C Printer Driver Development", W. Allen, et al., Hewlett-Packard Journal, Aug. 1992, pp. 93–102.
"Ink and Print Cartridge Development for the HP DeskJet 500C/DeskWriter C Printer Family", C. Maze et al., Hewlett-Packard Jour., Aug. 1992, pp. 69–76.
"Low-Cost Plain-Paper Color Inkjet Printing", D. Kearl et al., Hewlett-Packard Journal, Aug. 1992, pp. 64–68.

Primary Examiner—Mark J. Reinhart

[57] ABSTRACT

A system selectively enables a printer to deposit on a sheet C, M, Y and K color dots at each of the plurality of pixel locations to produce a color image. The system comprises a memory for storing C, M, Y and K color values for each pixel in the color image and a processor for controlling selective deposition of the C, M, Y and K colors. The processor determines a gray value for each pixel location from values stored in the C, M, and Y color planes. The processor subtracts the determined gray value from the C, M, and Y values which correspond to the pixel location and then determines a relationship of the gray value to a non-linear function and in dependence upon the relationship alters the C, M and Y pixel values accordingly. The processor either (1) adds the gray value back to the C, M, and Y values for the pixel location, or (2) adds a first portion of the gray value to the C, M, and Y values for the pixel location and a second portion of the gray value to the K value for the pixel location; or (3) adds all of the gray value to a K value for the pixel location. As a result, the C, M, Y and K values are altered in accordance with the determined gray value. The altered color values are then prioritized and the processor determines which colors should be printed at each pixel location and diffuses color error values to neighboring pixel locations after such determination. The prioritization procedure enables print priority to be given to either the brightest color dot or to the color dot that is most visible to the human eye.

15 Claims, 5 Drawing Sheets

BI-LEVEL DIGITAL COLOR PRINTER SYSTEM EXHIBITING IMPROVED UNDERCOLOR REMOVAL AND ERROR DIFFUSION PROCEDURES

FIELD OF THE INVENTION

This invention relates to digital color printers which produce binary level color dots to create a full-color representation of an image and, more particularly, to a digital color printer with undercolor removal and error diffusion procedures that enable improved gray scale representations to be achieved.

RELATED APPLICATIONS

The following related applications are assigned to the assignee of the present application and are incorporated herein by reference:

Attorney Docket 1094206-1 entitled ADAPTIVE COLOR RENDERING BY AN INKJET PRINTER BASED ON OBJECT TYPE, filed concurrently herewith in the names of Thomas G. Smith, et al., Ser. No. 08/189,006; Attorney Docket 1094219-1 entitled COLOR HALFTONING OPTIONS INFLUENCED BY PRINT MODE SETTING, filed concurrently herewith in the names of Kirt A. Winter, et al., Ser. No. 08/187,933; Attorney Docket 1094220-1 entitled MANUAL/AUTOMATIC USER OPTION FOR COLOR PRINTING OF DIFFERENT TYPES OF OBJECTS, filed concurrently herewith in the names of Sachin S. Naik, et al., Ser. No. 08/187,942; Attorney Docket 1094173-1 entitled COLOR DIGITAL HALFTONING USING COLOR VECTOR DITHERING, filed concurrently herewith in the names of Alexander Perumal, Jr., et al., Ser. No. 08/187,935; Attorney Docket 1094230-1 entitled COLOR DIGITAL HALFTONING USING COLOR VECTOR DITHERING AND BLACK AND SECONDARY COLOR REPLACEMENT, filed concurrently herewith in the names of Alexander Perumal, Jr., et al, Ser. No. 08/189,541; and Attorney Docket 1094120-1 entitled AUTOMATED OPTIMIZATION OF HARDCOPY OUTPUT, filed concurrently herewith in the names of Steven O. Miller, et al., Ser. No. 08/188,618.

BACKGROUND OF THE INVENTION

Currently, both ink jet printers and laser printers are capable of producing full color images with high quality gray scale precision. Such color printers are controlled by a printer driver program which provides an interface between an application program running on a host processor and the printer. Normally, a user creates a document using an application on the host computer and then calls for initiation of the printer driver program. In response to the users instituting a print command, the host computer transmits a series of page descriptions to the printer driver. The printer driver then proceeds to use built-in functions to rasterize the page description into a pixel map of a predefined resolution (e.g. 300 dots per inch, 600 dots per inch, etc.). Each pixel in the pixel map comprises, for instance, three eight-bit values corresponding to red, green and blue values derived from a display device in the host processor. The printer driver adjusts the color values in accordance with a predetermined calibration function so as to assure that the to-be-printed colors will appear the same as the colors displayed on the display device. At the same time, the red, green and blue values are converted to Cyan (C), Magenta (M), and Yellow (Y) values. As a result, each pixel is then represented by three eight-bit values which identify the corresponding levels of C,M,Y that will be used to subsequently control the print mechanism. An additional eight-bit value is supplied for a pixel black (K) dot is to be applied at the pixel location.

Most color printers are binary in nature, in that they either apply a full color dot or no color dot to a pixel location. Such color printers do not employ a control mechanism to enable adjustment of the intensity of a particularly applied color dot. As a result, a printer driver for a binary color printer employs a color half toning process which reduces the 24 bit color information to 3 bits per pixel print position (1 bit for each of the C, Y, and M color planes).

The half-toning process may use a number of procedures to improve the color representation of the image. In theory, equal parts of C, M and Y should subtract all light and create a pure black. However, due to impurities present in all printing inks, a mix of these colors generally yields a non-black color. To compensate for this deficiency, some printers include a rule that C, M and Y color dots will never be overprinted in registration. Instead, a K dot is printed from the K color plane. In such case, a "mottled" image often appears as a result of the interspersal of K dots. This creates a discontinuity in the half-tone pattern.

Printer systems which enable overprinting of CMY and K dots employ additional procedures to improve image color representation. One such procedure is "undercolor removal" (UCR) and another is "gray component" replacement (GCR)—both available in the Adobe Photoshop software, available from the Adobe Corporation, 158 Charleston Road, Mountain View, Calif. 94039. In UCR, K dots from the K image plane are used to add depth to shadow areas and to neutral colors. In GCR, more K ink is used in over a wider range of colors.

Once a binary color printer has converted a particular pixel location from RGB to CMY and then converted the CMY values to binary values for printing, "error values" will be present. These error values occur due to the fact that while there are a possible 255 levels of color that can be represented by an 8 bit color value, the binary printer only prints one of two colors for each of CMY and K. As a result, an error value occurs unless a particular printed pixel color has a zero or 255 color value. Prior art printers have employed an "error diffusion" process whereby the error value is "diffused" to neighboring pixel positions. In converting a pixel's color value, the value is tested against a threshold (e.g. 127) to determine if the color value is closer to a full saturated value (255) or closer to white (0). Depending upon which side of the threshold the color value resides, the pixel value is converted to either a 255 or a 0 value. Then, a difference value between the input color value for the pixel and its output level (set to either 0 or 255) is established. This is the diffusion error which is divided up and distributed to neighboring pixels yet to be processed (e.g. a pixel next to be processed on the raster line and 3 pixels on the immediately lower raster line that are neighbors to the pixel just processed). One such error diffusion process is described by Floyd and Steinberg, in "An Adaptive Algorithm For Spatial Gray Scale", SID 75 Digest; Society for Information Display, 1975, pages 36–37. See also U.S. Pat. No. 4,680,645 to Meyer et al.

In the Floyd et al. error diffusion procedure, pixels are processed from left to right along each raster line. Raster lines are processed from top to bottom and the error value from each pixel is broken up into four parts which are distributed to neighboring pixels, with the next pixel to be processed receiving 7/16ths of the error value, the neighboring pixel to the lower right on the next raster line receiving 1/16th of the error value, the pixel immediately below the pixel just processed receiving 5/16ths of the error value and, the pixel to the lower left of the pixel just processed receiving 3/16ths of the error value.

There is a continuing need to improve the clarity of color images produced by binary color printers. To improve clarity, image noise must be reduced so as to avoid the mottled appearance that may appear in certain gray scale areas. Furthermore, color conversion procedures used in such printers must take into account the fact that many printers are constructed so as to prevent C,M and Y overprints in registration and to further prevent any black/C,M or Y overprints.

Accordingly, it is an object of this invention to provide a binary color printer with a means for improving print image clarity.

It is yet another object of this invention to provide a binary color printer with means for automatically determining if a gray scale should be represented by a black dot or a combination of C,M or Y dots.

It is yet another object of this invention to provide a binary printer with an improved error diffusion process that is adaptive in accordance with a characteristic of a color to be printed.

SUMMARY OF THE INVENTION

A system selectively enables a printer to deposit on a sheet C,M, Y and K color dots at each of the plurality of pixel locations to produce a color image. The system comprises a memory for storing C, M, Y and K color values for each pixel in the color image and a processor for controlling selective deposition of the C, M, Y and K colors. The processor determines a gray value for each pixel location from values stored in the C, M, and Y color planes. The processor subtracts the determined gray value from the C, M, and Y values which correspond to the pixel location and then determines a relationship of the gray value to a non-linear function and in dependence upon the relationship alters the C, M and Y pixel values accordingly. The processor either (1) adds the gray value back to the C, M, and Y values for the pixel location, or (2) adds a first portion of the gray value to the C, M, and Y values for the pixel location and a second portion of the gray value to the K value for the pixel location; or (3) adds all of the gray value to a K value for the pixel location. As a result, the C, M, Y and K values are altered in accordance with the determined gray value. The altered color values are then prioritized and the processor determines which colors should be printed at each pixel location and diffuses color error values to neighboring pixel locations after such determination. The prioritization procedure enables print priority to be given to either the brightest color dot or to the color dot that is most visible to the human eye.

DETAILED DESCRIPTION OF THE INVENTION

Figure 1:
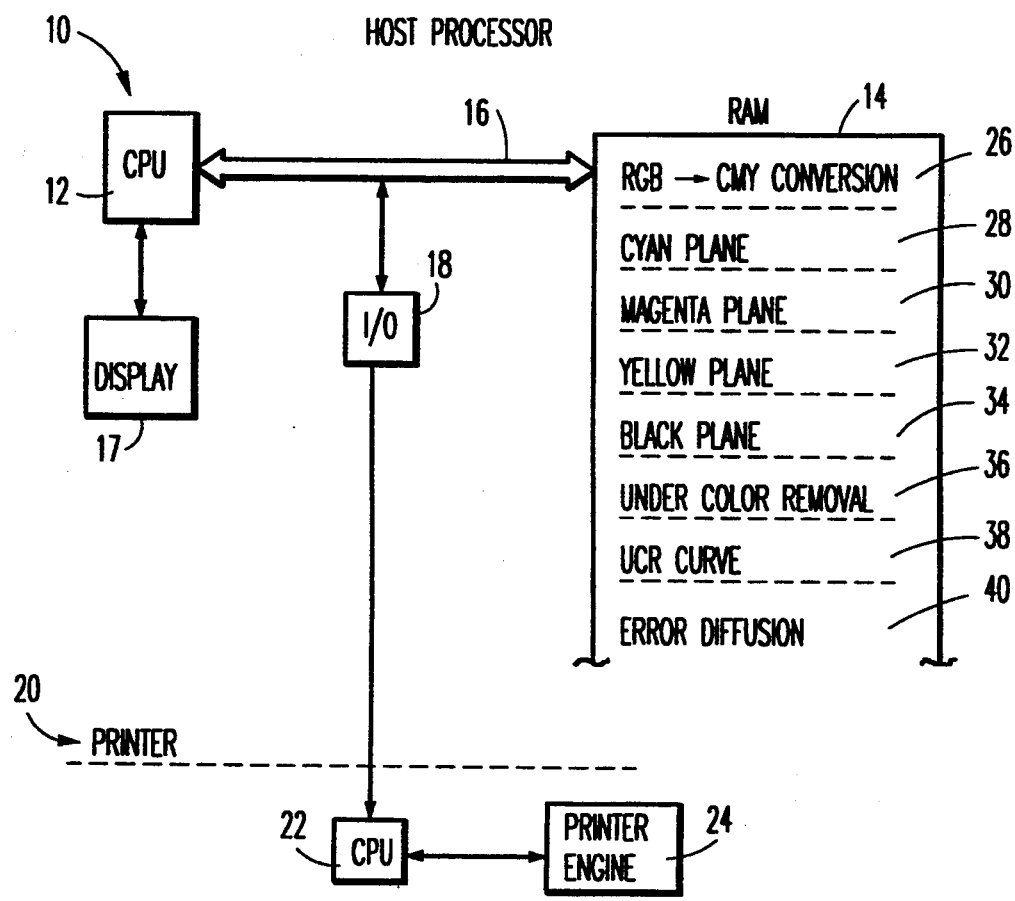
FIG. 1 is a high level block diagram showing a preferred embodiment of the invention.

Referring to FIG. 1, a host processor 10 includes a central processing unit (CPU) 12 which communicates with a random access memory (RAM) 14 via a bus 16. A display 17 enables visualization of a color image from CPU 12. An input/output (I/O) module 18 enables data flow to a connected printer 20. Printer 20 includes a CPU 22 and a print engine 24, both of which act to provide binary dot pattern color images.

In RAM 14, a plurality of procedures and storage areas are included which enable the system of FIG. 1 to carry out the invention hereof. RAM 14 includes an RGB to CMY conversion procedure 26, and storage areas 28, 30, 32 and 34 which respectively store C, M, Y and K pixel planes for a color image. RAM 14 further includes an undercolor removal (UCR) procedure 36 that enables the gray content of each pixel in the color image stored in image planes 28, 30, 32 and 34 to be determined and to then be utilized to determine which gray scale pixel locations of the image should be printed using C, M, Y only, or K only. A UCR curve 38, that is a non-linear function, is employed during the execution of the UCR procedure. Finally, an error diffusion procedure is stored in RAM 14 and enables diffusion of errors created during the performance of the UCR procedure to be propagated to neighboring pixels.

Initially, CPU 12, in conjunction with RGB to CMY conversion procedure 26, converts each red, green, blue pixel value from an image on display 17 to C M and Y values. During this conversion, an adjustment is made in the C M and Y values to take into account any color variations from standard colors that appear on display 17. Once the RGB-CMY conversion procedure has been completed, the image is represented by separate C M and Y image planes with each image plane including an 8 bit pixel value for each pixel location evidencing the intensity of the respective color for that pixel location. Thus, Cyan plane 28 will have an 8 bit value indicative of the Cyan intensity, Magenta plane 30 will have an 8 bit value indicative of the Magenta value etc. An additional K plane, 34 includes an 8 bit K value for each pixel location. Before the respective CMY and K planes are passed to CPU 22 in printer 20, they are subjected to at least two procedures which enable an adjustment of the values of the respective colors to improve gray scale presentation in the image. Those procedures are UCR procedure 36 and error diffusion procedure 40.

Figure 2:
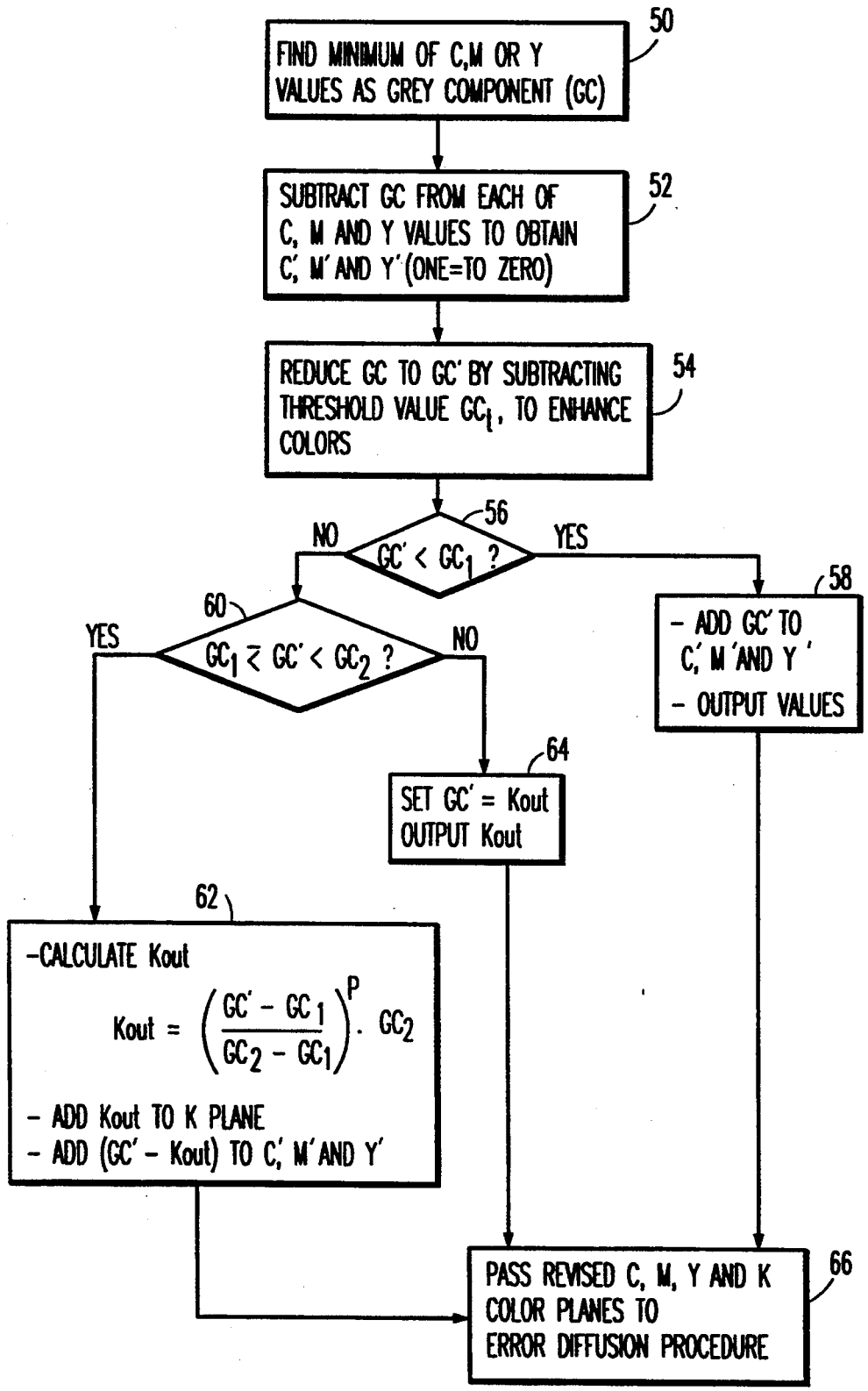
FIG. 2 is a high level flow diagram illustrating the undercolor removal procedure employed by the invention.

In FIG. 2, the UCR procedure is illustrated by a flow diagram. The UCR procedure is applied to each pixel, in order, and across and entire raster image. As shown in box 50, the UCR procedure begins by finding a minimum value for each of the C M or Y values corresponding to a pixel location, from C M and Y planes 28, 30 and 32. That minimum value is the gray component (GC) of the pixel location color and is subtracted from each of the C M and Y values to obtain C', Y', and M' pixel color values Obviously, one such value will be equal to 0 (box 52).

Figure 3:
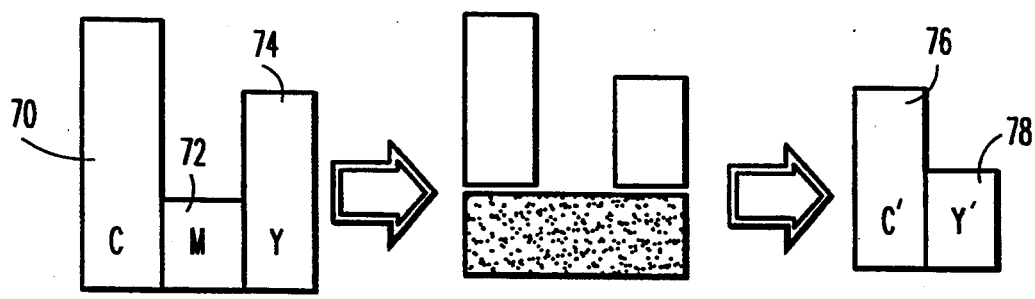
FIG. 3 is a schematic illustration indicating how gray content of a pixel color is determined.

The procedure shown in box 52 is illustrated in FIG. 3. A representative pixel is shown as having C M and Y components 70, 72 and 74 respectively. Since the M component 72 is the minimum value, its value is subtracted from each of the C M and Y components 70, 72 and 74, resulting in C' component 76 and Y' component 78.

Returning to FIG. 2, the resultant GC value determined in box 52 is reduced by a small threshold value $GC_t$ to enable an enhancement of lighter colors. A preferred value for $GC_t$ is approximately 5% (of GC). This subtraction insures that light colors migrate to the surface of the color gamut and become somewhat more vivid.

The subtraction of $GC_t$ from GC results in a gray color value GC'. At this stage, the procedure employs GC' to determine whether the particular color values for the pixel location should be altered by (1) just adding back GC' to the C', Y', and M' values; or (2) whether a portion of GC' should be added back to the C', M' and Y' values and another portion of GC' should be added to the K value for the pixel location; or (3) whether all of the GC' value should be added to the K value for the pixel. A non-linear UCR curve is employed by UCR removal procedure 36 to enable the aforesaid determinations to be made.

Figure 4:
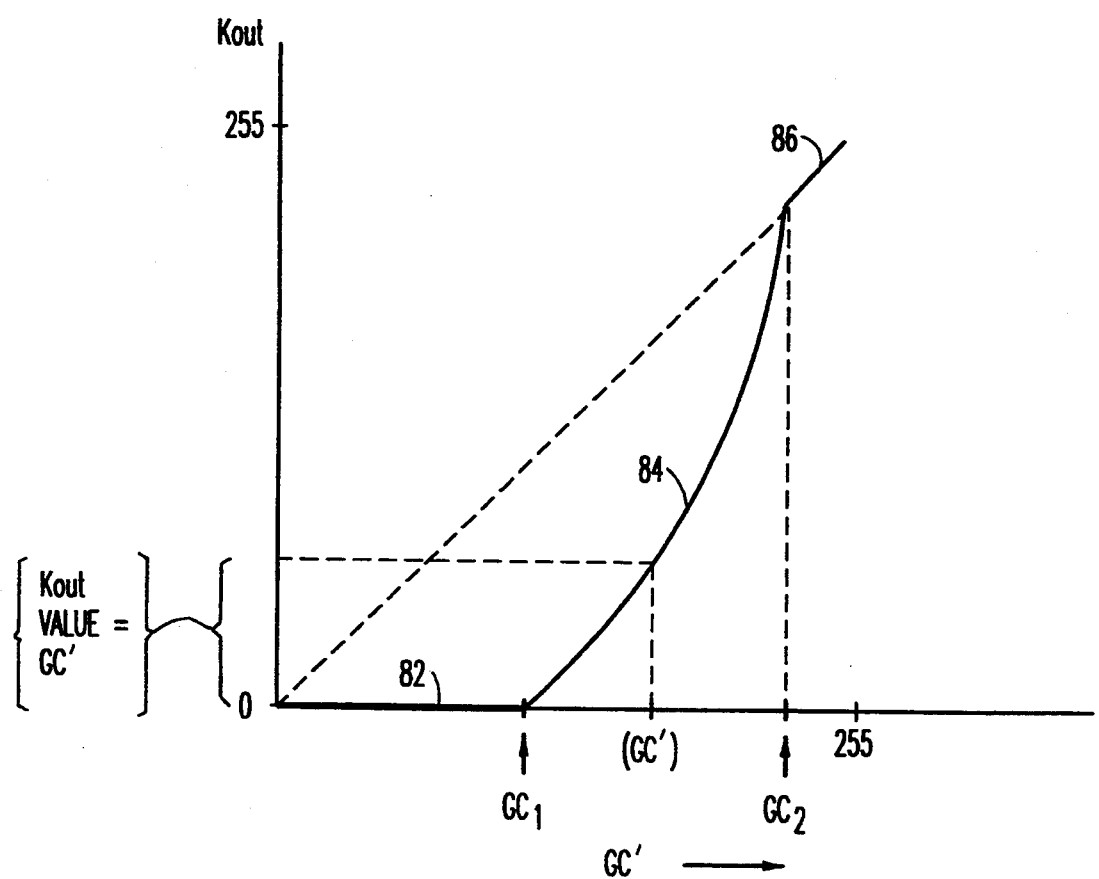
FIG. 4 is a graph which plots an outputted black value (Kout) against a modified gray content determination for a pixel.

UCR curve 80 (FIG. 4) is stored in RAM 14 as a database and is merely illustrated as a plot in FIG. 4 for explanatory purposes. Curve 80 is a plot of gray component GC' against Kout value (kout equals outputted black value). It is assumed for the purposes of this example, that each color value is 8 bits and enables 255 color levels to be represented. As a result Kout may vary between 0 and 255 (as well as GC'). Curve 80 is divided into 3 segments, i.e. 82, 84 and 86. Curve segment 82 is linear from 0 to $GC_1$; curve segment 84 is exponential from $GC_1$ to $GC_2$; and curve segment 86 is again linear everywhere above $GC_2$. Exemplary color values for $GC_1$ and $GC_2$ are 105 and 230 respectively. Thus, if the value GC' is less than or equal to 105 (i.e. a "light gray scale area"), curve 80 shows that no Kout value is produced and that the entire gray component consists only of the value GC'. That value is added back to the C', M' and Y' values causing the pixel location's gray scale to be represented only by C M and Y colors.

If, however, GC' exhibits a value between 105 and 230 (a "medium" gray scale area), then a vertical line drawn from the value of GC' to curve 84 enables a determination of a Kout value to be added back to the K plane for the respective pixel That Kout value is subtracted from GC' and the remainder is added back to the C', M' and Y' planes, respectively. Finally, if the value of GC' exceeds 230 (dark gray) then the entire value of GC' is added back to the K plane and nothing is added to the C', M' and Y' planes for the respective pixel location (curve segment 86 is a plot of GC'=Kout).

Returning to FIG. 2, the functions indicated in boxes 56 et seq. illustrate the procedure above described with respect to FIG. 4. Initially, as shown in decision box 56, it is determined whether GC' is less than $GC_1$. If yes, then it is known that GC' resides along curve segment 82 and the value of GC' (box 58) is added back to C', M' and Y' and the resultant color values are outputted. By contrast, if decision box 56 indicates no, then it is next determined (decision box 60) whether GC' falls between $GC_1$ and $GC_2$. If yes, GC' resides somewhere along curve segment 84. As a result, a portion of GC' is allocated to the K value for the pixel location and a portion is added back to the C', M' and Y' values. The portion derivations are shown in box 62. The portion of GC' allocated to Kout is determined by a calculation of equation 1 below:

$$Kout = \left( \frac{GC' - GC_1}{GC_2 - GC_1} \right)^P * GC_2$$

Equation 1 is an exponential function which describes curve segment 84 and enables (dependent upon the value of GC') for the value of Kout to be calculated. A preferred value for P is approximately 1.2.

Once the value of Kout is calculated, Kout is added to the value in the K plane for the respective pixel location. The value of Kout is then subtracted from GC' and the difference is added back to each of the C', M' and Y' color planes for the pixel location.

Returning to decision box 60, if it is determined that GC' is not less than $GC_2$, the procedure moves to box 64 where GC' is set equal to Kout which is then outputted to the K plane value for the pixel location. In essence, if GC' exceeds $GC_2$, the decision is to allocate all of the value of GC' to the K plane of the pixel location.

In summary therefore, if the gray component value for a pixel falls along curve segment 82, the gray component value is represented by the C M and Y values after the gray component has been added back thereto. If the gray component value resides along curve segment 84, the gray component value is divided between the K plane and the C M and Y planes in accordance with the calculation shown above by equation 1 and box 62 (FIG. 2). If the gray component value exceeds a second threshold ($GC_2$), then all of the gray component value is added back to the K plane for the pixel location. At this point, each of the CMY and K planes have been modified in accordance with the UCR procedure to better represent the gray component contained within the colors making up a respective pixel location. The revised CMY and K values are then passed to an error diffusion procedure shown in FIG. 5 which then adjusts the CMY and K values to assure that errors resulting from the printing of a binary color are properly allocated to neighboring pixels.

Figure 5:
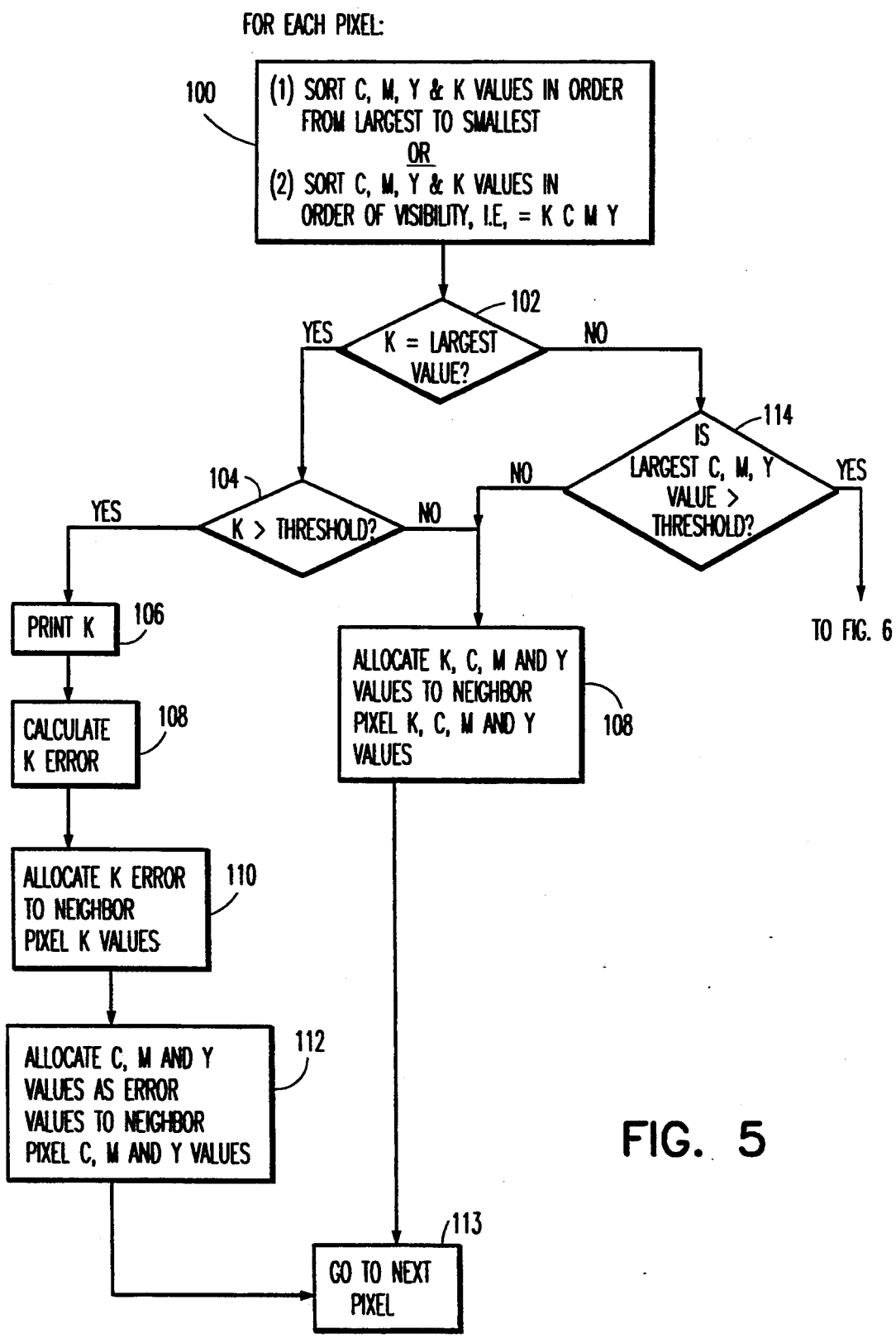
FIGS. 5 and 6 are high level logical flow diagrams illustrating the error diffusion process employed by the invention.
Figure 6:
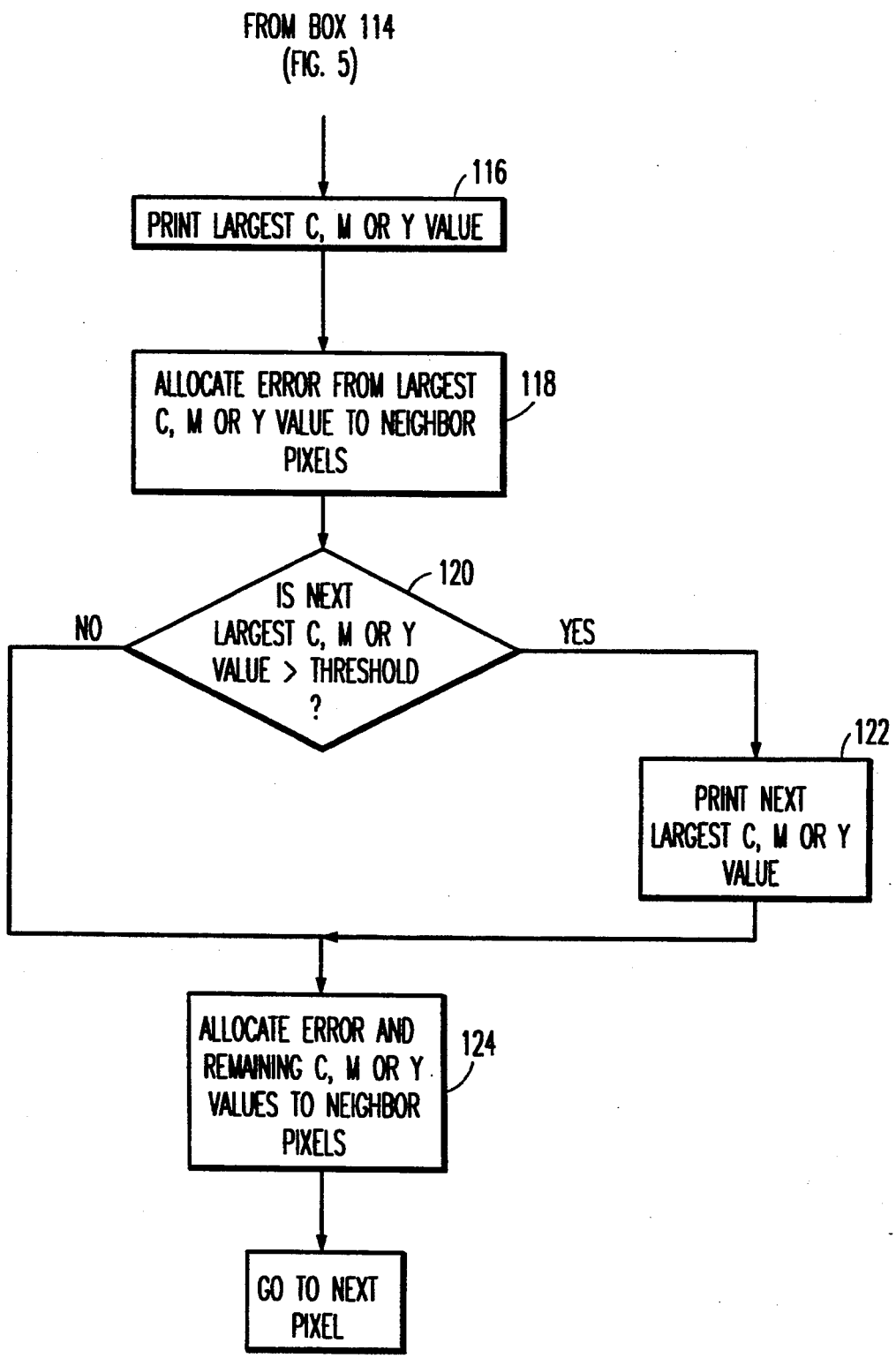

As will hereafter understood, the error diffusion procedure shown in FIGS. 5 and 6 provides a dependent method of diffusion which assures that two undesired circumstances do not occur. First, the error diffusion procedure assures that a K dot and a C, M or Y dot will not be overprinted in any one pixel location. Furthermore, the error diffusion procedure prevents an overprinting of C M and Y dots in any one location.

Referring to box 100, the error diffusion procedure commences with either of two sort routines, with routine 1 being most preferred. Routine 1 sorts the CMY and K values for each pixel location in order of the largest to the smallest color value. Routine 2 sorts the CMY and K values in accordance with the most visible to the least visible, that order always being KCMY.

Because Routine 1 is adaptive in accordance with the values of the individual CMY and K colors, it is the preferred procedure and will be described in detail hereafter.

Assuming that routine 1 has been carried out and that the CMY and K color values for a pixel location are now ordered from largest to smallest color value, the largest color value is first examined. It is initially determined (box 102) whether K is the largest value. If K is found to be the largest color value, the procedure moves to box 104 where the K value is tested against a threshold. In this case, the threshold is preferably midway between 0 and 255 (e.g. 127). If the K value is greater than 127, a command to print the K value is given (box 106), it being remembered that a K value will never be printed in a same dot location as any other color dot. If, by contrast, the K value is less than the threshold (box 104), the procedure moves to box 108. In this case, since all of the color values for the pixel are thereby determined to be less than the threshold value, their values are allocated to neighboring pixel locations in accordance with a preferred diffusion procedure and the method proceeds to the next pixel location (box 110).

Returning to box 106 wherein it is determined that a K dot should be printed, thereafter the difference between the K value and the binary printed value is determined as an error value and that error value is allocated to K values for neighboring pixels. For instance, if the pixel K value is equal to 200, an error of −55 is allocated to neighboring pixels (e.g. in accordance with the prior art procedure of Floyd and Steinberg as referred to above). This procedure is described in boxes 108 and 110. Next, because a black dot has been ordered printed, the remaining C M and Y values for the pixel location are allocated as error values to neighboring pixel C M and Y values (box 112). The procedure then moves to the next pixel location.

Returning to decision box 102, if K is found not to be largest color value for a pixel, the procedure moves to decision box 114 wherein it is determined if the largest C M or Y value is greater than the threshold. If no, the procedure moves to boxes 108 and 110 as above described. If yes, a command is generated to print the largest C M or Y value (box 116) (see FIG. 6) and the error which results from the printing of the binary value of the largest C M or Y value is allocated amongst neighboring pixels (box 118). The procedure then moves to decision box 120 wherein it is determined whether the next largest C M or Y value is greater than threshold 127. If yes, the next largest C M or Y value is printed (box 122), and the error value from that printed C M or Y value is allocated to neighboring pixels. Finally (box 124), the remaining C M Y or K value is allocated as an error value to neighboring pixels—because it is known that at least two color pixels have been already overprinted and C M and Y are never overprinted together.

If it is determined in box 120 that the next largest C M or Y value is not greater than the threshold, then all remaining CMY or K values are allocated as error values to neighboring pixels. The procedure then moves to the next pixel location until all pixel locations have been processed. At this stage, the raster scan image, in the form of four color planes, has been fully error diffused and is ready for passage to the print mechanism for printing.

It should be understood that the foregoing description is only illustrative of the invention. Various alternatives and modifications can be devised by those skilled in the art without departing from the invention. For instance, the specific numerical color values are given only for exemplary purposes and may be modified by those skilled in the art. Furthermore, while segment 84 of the curve in FIG. 4 is shown as an exponential function, it also could be modified into a linear or other function that enables an appropriate gray component/black component division, Accordingly, the present invention is intended to embrace all such alternatives, modifications and variances which fall within the scope of the appended claims.

We claim:

1. A system for selectively enabling a digital printer to deposit on a sheet, Cyan (C), Magenta (M), Yellow (Y) and Black (K) color dots at each of a plurality of pixel locations, to produce a color image, said system comprising:

memory means for storing planes of C, M, Y and K color values for each pixel in the color image;

processor means coupled to said memory means, said processor means (i) determining a gray value for each pixel location from said color values stored in said C, M, and Y color planes and for subtracting a determined gray value for a pixel location from C, M, and Y values corresponding to said pixel location, (ii) determining in what segment of a non-linear function that defines a curve having plural segments said determined gray value is located, (iii) based upon a location of said determined gray value, creating changed color values for each said pixel location by:

(a) adding said gray value to said C, M, and Y color values for said pixel location, if said gray value is located in a first segment of the curve defined by said non-linear function, or (b) adding a portion of said gray value to said C, M, and Y color values for said pixel location and another portion of said gray value to a K color value for said pixel location, if said gray value is located in a second segment of the curve defined by said non-linear function, or (c) adding all said gray value to a K value for said pixel location, if said gray value is located in a third segment of the curve defined by said non-linear function, and (iv) diffusing color error values to neighboring pixel locations; and print means responsive to said processor means for printing said color image comprising error diffused color values transmitted from said processor means.

2. The system as recited in claim 1 wherein said processor means error diffuses said color pixel values by: prioritizing said changed color values; determining which of prioritized, changed color values at each pixel location are to be printed; and diffusing color error values at each pixel location to neighboring pixel locations.

3. The system as recited in claim 2 wherein said processor means, in determining which of prioritized, changed color values at each pixel location are to be printed, prevents simultaneous deposition by said print means of a K dot with any other color dot at a pixel location, or C M and Y color dots at a pixel location.

4. The system as recited in claim 3 wherein a said gray value for a pixel location is equal to a minimum value of C M and Y values for said pixel location.

5. The system as recited in claim 4, wherein said processor, subsequent to determining said relationship, reduces said gray value by a predetermined percentage to enhance image clarity.

6. The system as recited in claim 4 wherein said non-linear function relates a range of said gray values to a range of K (Black) values.

7. The system as recited in claim 1, wherein said first segment of the curve defined by said non-linear function is a substantially linear segment and said third segment is substantially linear, said gray value relationship to segments of said non-linear function enabling determination of a K value therefrom.

8. The system as recited in claim 7, wherein if said processor means determines that said gray value for a pixel location is located within said first substantially linear segment, said processor means changes color values for said pixel location by adding said gray value to said C M and Y values for said pixel location.

9. The system as recited in claim 7, wherein if said processor means determines that said gray value for a pixel location is located within said second segment of the curve defined by said non-linear function, said processor means changes said color values for said pixel location by deriving a value Kout and adding said value Kout to a K value for said pixel location and deriving a second value which is a difference between value Kout and said gray value and adding said second value to C M and Y values for said pixel location.

10. The system as recited in claim 9 wherein said second segment is exponential.

11. The system as recited in claim 10 wherein said processor means determines said value Kout by solution of the relationship below:

$$Kout = \frac{GC' - GC_1^P}{GC_2 - GC_1} * GC_2.$$

where:
$GC'$ = gray value
$GC_1$ = a gray content value defining a terminus of said first substantially linear segment,
$GC_2$ = a terminus of said second exponential segment, and
p = an exponent.

12. The system as recited in claim 7, wherein if said processor means determines that said gray value for a pixel location is within said third substantially linear segment, said processor means adds said gray value to a K value for said pixel location.

13. The system as recited in claim 2, wherein said processor means prioritizes said changed color values by sorting said color values by magnitude, with a largest color magnitude being first and a smallest color magnitude being last.

14. The system as recited in claim 2 wherein said processor means prioritizes said changed color values by visibility of said color values.

15. The system as recited in claim 14 wherein said processor means arranges said changed color values as K, C, M and Y.

* * * * *